United States Patent Office 3,740,396
Patented June 19, 1973

3,740,396
THIAZOLINYL AND THIAZINYL DERIVATIVES OF BENZOTRIAZOLES
Rudiger D. Haugwitz, Highland Park, and Venkatachala L. Narayanan, Hightstown, N.J., assignors to E. R. Squibb & Sons, Inc., Princeton, N.J.
No Drawing. Filed Sept. 7, 1971, Ser. No. 178,394
Int. Cl. C07d 93/06
U.S. Cl. 260—243 R     8 Claims

ABSTRACT OF THE DISCLOSURE

Thiazolinyl and thiazinyl derivatives of benzotriazoles are provided having the structure

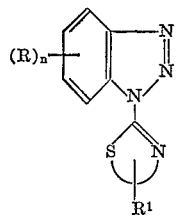

and which are useful as anthelmintic agents.

---

The present invention relates to thiazolinyl and thiazinyl derivatives of benzotriazoles having the structure

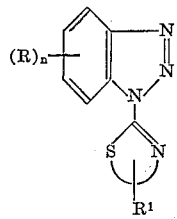

(I)

wherein R is hydrogen, lower alkyl, lower alkoxy, aryl, aryloxy, acyl, aroyl, lower alkylthio, substituted amido

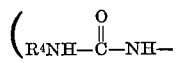

wherein $R^2$ is hydrogen, lower alkyl or aryl), nitro, halogen, amino, substituted amino, carbamate ester (—NHCOOR³ wherein $R^3$ is alkyl or aryl) or ureido

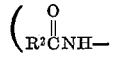

wherein Q is O or S and $R^4$ is lower alkyl, aryl or cycloalkyl); $R^1$ is hydrogen, lower alkyl or aryl and $n$ is 1 or 2.

The radical

represents a 5- or 6-membered ring containing 3 or 4 carbon atoms, respectively, wherein the additional 2 or 3 carbon atoms (not shown) may include a substituent other than hydrogen as indicated above.

The lower alkyl groups represented by the above R groups include straight or branched chain aliphatic hydrocarbon radicals having up to seven carbon atoms, such as methyl, ethyl, propyl, isopropyl, butyl, isobutyl, t-butyl, amyl, hexyl, heptyl, and the like. The lower alkyl groups can include as substituents any of the aryl groups mentioned below as well as halogen.

The alkoxy group or that portion of the alkoxycarbonyl group includes straight and branched chain radicals of up to and including seven carbon atoms, corresponding to the above alkyl groups, e.g., methoxy, ethoxy, propoxy, isopropoxy, and the like. The aryloxy group or that portion of the aryloxycarbonyl group includes any of the aryl groups set out below.

The term halogen includes each of four halogens, but fluorine and chlorine are preferred.

The substituted amido groups

wherein $R^2$ can be lower alkyl, arylalkyl, alkylaryl or aryl, wherein lower alkyl and aryl are as defined herein, can include methylamido, ethylamido, isopropylamido, heptylamido, phenylamido, benzylamido, or naphthylamido.

The substituted amino groups include mono- or di-lower alkyl-, arylalkyl-, lower alkylaryl- or arylamino wherein lower alkyl and aryl are as defined herein, such as methylamino, ethylamino, isopropylamino, heptylamino, dimethylamino, diethylamino, ethylmethylamino, butylmethylamino, ethyl i-propylamino, anilino, benzylamino, diphenylamino, naphthylamino, or N-methyl-N-phenylamino and the like.

The term "aryl" includes monocyclic or bicyclic monovalent aromatic ring systems such as phenyl or naphthyl, These aryl radicals can include as substituents halogen, nitro, trifluoromethyl, alkoxy, alkanoic acid, amido or substituted amido as defined above or any of the alkyl groups mentioned hereinbefore.

The term "cycloalkyl" refers to saturated carbocyclic ring systems containing from three to about seven carbon atoms, such as cyclopropyl, cyclobutyl, cyclopentyl, cyclohexyl and cycloheptyl.

The acyl and aroyl groups included herein are derived from hydrocarbon carboxylic acids of less than twelve carbon atoms, which may be exemplified by the lower alkanoic acids (e.g., formic, acetic, propionic, butyric, valeric, trimethyl acetic and caproic acids), the lower alkenoic acids (e.g., acrylic, methacrylic, crotonic, 3-butenoic and senecioic acids), the monocyclic aryl-carboxylic acids (e.g., benzoic and toluic acids), the monocyclic aryl-lower alkanoic acids [e.g., phenacetic, β-phenylpropionic, α-phenylbutyric, and 5-(p-methylphenyl) pentanoic acids], the cycloalkyl carboxylic acids (e.g., cyclobutane carboxylic acid, cyclopentane carboxylic acid and cyclohexane carboxylic acid), the cycloalkenyl carboxylic acids (e.g., 2-cyclobutene carboxylic acid and 3-cyclopentene carboxylic acid), the cycloalkyl and cycloalkenyl-lower alkanoic acids [e.g., cyclohexaneacetic, α-cyclopentanebutyric, 2-cyclopenteneacetic and 3-(3-cyclohexene) pentenoic acid], and the like.

Exemplary of compounds falling within the present invention include, but are not limited to, the following set out in Table A below:

TABLE A

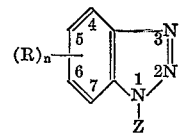

| R | n | Z |
|---|---|---|
| 1 ........ H | ------ | =N, S |
| 2 ........ Cl (5) | 1 | Same as above. |
| 3 ........ NO₂ (6) | 1 | Do. |
| 4 ........ CH₃ (5) | 1 | Do. |
| 5 ........ CH₃O (4) | 1 | Do. |
| 6 ........ CH₃S (5) | 1 | Do. |

TABLE A—Continued

| | R | n | Z |
|---|---|---|---|
| 7 | (CH₃)₂N— (6) | 1 | thiazole |
| 8 | C₆H₅ (5) | 1 | Same as above. |
| 9 | CH₃CO— (5) | 1 | Do. |
| 10 | Br (5) | 1 | Do. |
| 11 | Cl (6) | 1 | 4-methylthiazole |
| 12 | I (5) | 1 | Same as above. |
| 13 | Br (5,6) | 2 | thiazine |
| 14 | C₆H₅CO— (5) | 1 | Same as above. |
| 15 | C₆H₅O— (5) | 1 | Do. |
| 16 | C₆H₅— (5) | 1 | Do. |
| 17 | CH₃O (5,6) | 2 | 5-phenylthiazole |
| 18 | C₄H₉S (4) | 1 | Same as above. |
| 19 | C₆H₅CH₂ (5) | 1 | thiazole |
| 20 | NO₂ (6) | 1 | Same as above. |
| 21 | CH₃—C₆H₄—O— (5) | 1 | 5-phenylthiazole |
| 22 | Cl—C₆H₄— (5) | 1 | 4-methylthiazole |
| 23 | C₂H₅OC(O)—NH— (6) | 1 | thiazole |
| 24 | H | | Same as above. |
| 25 | H | | thiazine |
| 26 | NO₂ (5) | 1 | 5-(4-bromophenyl)thiazole |
| 27 | C₅H₁₁ (6) | 1 | thiazine |
| 28 | CH₃NH—C(O)—NH (5) | 1 | thiazole |
| 29 | CH₃CONH (6) | 1 | 5-(4-nitrophenyl)thiazole |

Compounds of Formula (I) can be prepared by first converting the benzotriazole (II) into its salt (III) by reacting (II) with a base such as a metal hydride such as sodium hydride, a metal amide, such as sodium amide, or an alkali metal alkoxide, such as sodium methoxide, potassium ethoxide or sodium butoxide,

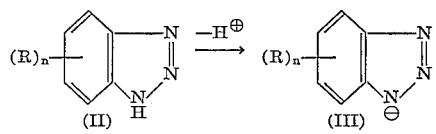

The above reaction can be brought about in a variety of aprotic solvents such as aromatic hydrocarbon, e.g., benzene, toluene or xylene, or ethers such as ethyl ether or glyme, at temperatures ranging from about 0° to about 150° for periods of about one hour to twenty-four hours. A slight excess of the base is desirable; thus the molar ratio of benzotriazole (II) to base can range from about 1:1 to about 1:2.

The salt (III) is reacted with an aliphatic haloalkyl-isothiocyanate (IV) to yield thiourea (V) which undergoes intramolecular alkylation to form the benzotriazoles (I)

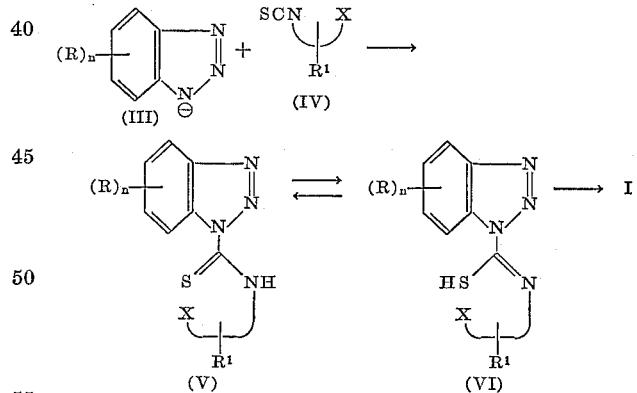

wherein X is Cl or Br and the portion

(which links N and X) in structure (IV) represents a chain of 2 or 3 carbon atoms, one carbon atom of which may include an R¹ substituent other than hydrogen.

The molar ratio of benzotriazole (III) to haloalkyl-isothiocyanate (IV) can range from 1:1 to 1:5. The reaction time can vary from about 1 to about 10 hours at temperatures from about 35° to about 150°.

The preparation of a variety of benzotriazoles is well documented in Elderfield's Heterocyclic Compounds, vol. 7, John Wiley and Sons, Inc., New York, 1961.

It is to be understood that unsubstituted benzotriazoles III, that is where R is hydrogen, can be employed to form compounds of Formula I and thereafter any of the other R radicals can be inserted in the benzotriazole ring in place of one or two hydrogens, employing conventional procedures as will be apparent to one skilled in the art.

Haloalkylisothiocyanates (IV) are readily synthesized from their corresponding haloalkyl amines (VII) and thiophosgene:

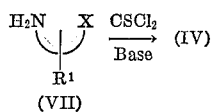

Additional routes toward compounds of structure (IV) are described in Houben-Weyl's Methoden Der Organischen Chemie, vol. 9, G. Thieme Verlay Stuttgart, 1955.

Benzotriazoles containing a free imino hydrogen are virtually tautomeric systems, differing in the position of the imino hydrogen as seen below (A⇌B). These benzotriazoles react like tautomeric mixtures of the two possible forms. The reaction products (C and D) are not necessarily obtained in equal parts but in proportions that differ from compound to compound, substituents and reaction conditions having a pronounced effect on the course of the reaction.

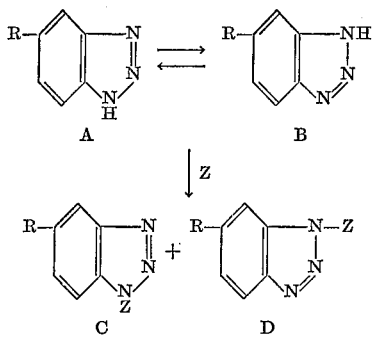

Examples of benzotriazole starting materials (II) which can be employed herein include the following:

TABLE B

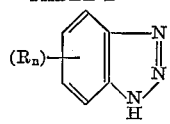

| | R | n |
|---|---|---|
| 1 | 5-NO$_2$ | 1 |
| 2 | 5-C$_6$H$_5$C(=O)— | 1 |
| 3 | 5-C$_6$H$_5$CH$_2$ | 1 |
| 4 | 5,6-di-CH$_3$ | 2 |
| 5 | 5-C$_4$H$_9$—C(=O)— | 1 |
| 6 | 5-N(CH$_3$)$_2$ | 1 |
| 7 | 6-C$_6$H$_5$OOCNH— | 1 |
| 8 | H | |
| 9 | 5-CH$_3$NH—C(=S)—NH | 1 |
| 10 | 7-CH$_3$S | 1 |
| 11 | 5-CH$_3$O | 1 |
| 12 | 5,6-di-Cl | 2 |
| 13 | 5-F | 1 |
| 14 | 5-CH$_3$—C$_6$H$_4$— | 1 |
| 15 | 5-C$_4$H$_9$ | 1 |
| 16 | 6-C$_6$H$_5$O | 1 |
| 17 | 5-C$_6$H$_5$C(=O)— | 1 |
| 18 | 6-CH$_3$C(=O)—NH— | 1 |

Examples of aliphatic haloalkylisothiocyanates which can be employed herein include the following:

SCN—CH$_2$CH$_2$Br
SCN—CH$_2$CH$_2$CH$_2$Cl
SCN—CH$_2$CH—Br
           |
           C$_6$H$_5$

SCN—CH$_2$CH—Cl
           |
           C$_6$H$_4$NO$_2$

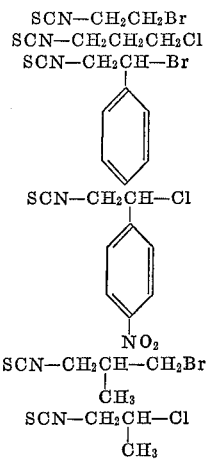

SCN—CH$_2$CH—CH$_2$Br
           |
           CH$_3$

SCN—CH$_2$CH—Cl
           |
           CH$_3$

The compounds of Formula I form physiologically acceptable acid-addition salts with inorganic and organic acids. These acid-addition salts frequently provide useful means for isolating the products from reaction mixtures by forming the salt in a medium in which it is insoluble. The free base may then be obtained by neutralization, e.g., with a base such as sodium hydroxide. Then any other may again be formed from the free base and the appropriate inorganic acid. Illustrative are the hydrohalides, especially the hydrochloride and hydrobromide which are preferred, sulfate, nitrate, phosphate, oxalate, tartrate, maleate, fumarate, citrate, succinate, methanesulfonate, benzenesulfonate, toluenesulfonate, and the like.

The benzotriazoles described herein have anthelmintic activity and are useful in the treatment and/or prevention of helminthiasis, a parasitic disease which causes widespread and often serious infection in domesticated animals such as swine, horses, cattle, sheep and goats. In treating domesticated animals, the compounds may be mixed with a nontoxic, edible carrier to form a feed supplement which is then incorporated in the animal feed in the desired concentration, or they may be administered in unit dosage forms which, in the case of large domesticated animals, take the form of boluses, or in the form of a liquid drench. Alternatively, water-soluble salts or a dispersable, wettable powder containing the anthelmintic agent may be added to the drinking water of the animals.

The preferred dosage level for treating a helminth infection will depend to a large extent on the particular benzotriazole compound being employed, on the severity of the infection and on the particular species of animal to be treated. In general, the benzotriazoles exhibit anthelmintic activity when administered to animals in a daily dose of about 50 to about 300 mg. per kilogram of animal body weight. It is preferred to employ in the range of 100–200 mg. per kilogram of body weight per day. The compounds may be given in a single dose or divided into a plurality of smaller doses. If desired, the course of treatment may be extended over a period of days in which case the optimum daily dose level may be lowered. When the compounds are to be employed primarily as prophylactic agents for the prevention of helminthic infections, the preferred daily dose level is, of course, lower than the therapeutic level is, preferably in the range of about 10–70 mg. per kilogram of body weight. The benzotriazoles may be incorporated in the animal feeds, and this method of administration is preferred when the compounds are to be used prophylactically, in which case they are incorporated in the feeds at concentrations such that the animal will consume daily from about 10 to about 70 mg. of benzotriazole per kilogram of body weight.

The means employed for administering these benzotriazoles to animals are not critical, and any of the methods now used or available for treating animals infected with or susceptible to parasitic infections are satisfactory. When these substances are employed therapeutically to treat an established infection, they are conveniently administered in a unit dosage form such as in a capsule, bolus, tablet, or as a liquid drench. It will be noted that all of these methods contemplate oral administration, since this is the most effective method of treating the worm-infected stomach or intestinal tract.

When the benzotriazoles are to be administered in unit dosage form, capsules, boluses or drenches containing the desired amount of anthelmintic distributed in a pharmaceutically acceptable vehicle are usually employed. These are prepared by intimately and uniformly mixing the active ingredient with suitable finely divided diluents, suspending agents, fillers, disintegrating agents and/or binders such as starch, lactose, talc, magnesium stearate, vegetable gums and the like. These unit dosage formulations may be widely varied with respect to their total weight and content of anthelmintic agent, depending on factors such as the type of host animal to be treated, the dose level desired, and the severity and type of parasitic infestation. For large animals such as sheep, swine or cattle, boluses weighing up to 15 grams may be used, although it is preferred to employ boluses weighing from 2–10 grams and containing from 1–5 grams of the anthelmintic agent. These boluses, as well as smaller size tablets, contain binders and lubricants, and are compounded by techniques known in this art. Capsules are readily prepared by mixing the active ingredient with a diluent such as starch or lactose and filling into the capsule.

In order to treat infected animals by means of a drench, the benzotriazoles are mixed with a suspending agent such as bentonite and the solid product added to water just prior to administration. The preferred drenches in accordance with this invention contain from about 5–50% by weight of benzotriazole compound.

The benzotriazoles described herein may also be administered as a component of the feed of the animals or dissolved or suspended in the drinking water. According to the invention, novel feed and feed supplement compositions are provided in which compounds of Formula (I) above are present as an active anthelmintic ingredient. Such compositions comprise the benzotriazoles intimately dispersed in or admixed with an inert carrier or diluent, i.e. one that is nonreactive with respect to the benzotriazole and that may be administered with safety to the animals. The carrier or diluent is preferably one that is or may be an ingredient of the animal ration.

In the feed supplement compositions the active ingredient is present in relatively large amounts. These supplements are suitable for addition to the feed either directly or after an intermediate dilution or blending step. Examples of carriers or diluents suitable for such compositions are solid orally ingestible carriers such as distillers' dried grains, corn meal, citrus meal, fermentation residues, ground oyster shells, Attapulgus clay, wheat shorts, molasses solubles, corn cob meal, edible vegetable substances, toasted dehulled soya flour, soybean mill feed, antibiotic mycelia, soya grits, crushed limestone and the like. The anthelmintic agents are intimately dispersed or admixed throughout the solid inert carrier by methods such as grinding, stirring, milling, or tumbling. By selecting proper diluents and by altering the ratio of carrier to active ingredient, compositions of any desired concentration may be prepared. Formulations containing from about 5% to about 50% by weight, and preferably from about 10–30% by weight, of active ingredient are particularly suitable for addition to feeds. The active compound is normally dispersed or mixed uniformly in the diluent but in some instances may be sorbed on the carrier.

Feed supplements are prepared by uniformly mixing the appropriate benzotriazoles with the carriers. Such supplements are added to the finished animal feed in an amount adequate to give the final concentration desired for controlling or treating helminthiasis by way of the animal ration. Although the preferred level in feeds will depend on the particular compound being employed, the anthelmintic compounds of this invention are normally fed at levels of 0.10–2.0% in the feed. One advantageous method of administering the compounds of this invention to animals whose feeds are conveniently pelleted, such as sheep, is to incorporate them directly in the pellets. For instance, benzotriazoles are readily incorporated in nutritionally adequate alfalfa pellets (during the pelleting operation) at levels of 0.5 to 5 grams per pound of pellets for therapeutic use, and at lower levels for prophylactic use, and such pellets fed to the worm-infested animals. Alternatively, the benzotriazoles may be incorporated in salt licks or salt blocks at any desired concentration (concentrations of 5–25% by weight are conveniently employed). Large animals such as sheep, cattle and goats, then receive the anthelmintics with their salt.

The following examples further illustrate and represent preferred embodiments of the invention:

EXAMPLE 1

1-(2-thiazolin-2-yl)-1H-benzotriazole

To a solution of benzotriazole in 150 ml. of dry glyme there is added 1.5 g. of sodium hydride and the mixture is stirred at room temperature for 15 minutes. Then, there is added 6.0 g. of 2-chloroethylisothiocyanate in 5 ml. of dry glyme and the mixture is refluxed for 30 minutes. The solvent is evaporated and water is added. The resulting solid is filtered off, dried and crystallized from benzene to yield 7 g., M.P. 179–181°.

Calcd. for $C_9H_8N_4S$ (percent): C, 52.93; H, 3.95; N, 27.44. Found (percent): C, 53.08; H, 4.14; N, 27.65.

EXAMPLE 2

5(and 6)-methyl-1-(2-thiazolin-2-yl)-1H-benzotriazole

To a solution of 5 g. of 5-methylbenzimidazole in 90 ml. of dry glyme, there is added 1.7 g. of sodium hydride (50% mineral oil dispersion). After one hour of stirring at room temperature, 5.0 g. of 2-chloroethylisothiocyanate in 10 ml. of glyme is added. The mixture is refluxed for two hours. The solvent is evaporated and water is added to the resulting residue. The solid is filtered off and crystallized from ethyl ether to yield 5.0 g., M.P. 147–151°.

Calcd. for $C_{10}H_{10}N_4S$ (percent): N, 55.03; H, 4.62; N, 25.66; S, 14.69. Found (percent): N, 54.76; H, 4.83; N, 25.61; S, 14.71.

EXAMPLE 3

5(and 6)-chloro-1-(2-thiazolin-2-yl)-1H-benzotriazole

To a solution of 4.9 g. of 5-chlorobenzotriazole in 100 ml. of dry glyme, there is added 1.2 g. of sodium hydride (50% mineral oil dispersion). After one hour of stirring at room temperature, 3.6 g. of 2-chloroethylisothiocyanate is added and the mixture is refluxed for two hours. The solvent is removed under vacuum and water is added to the residue. The resulting solid is filtered off and crystallized from ethyl ether to furnish 2.6 g., M.P. 126–136°.

Calcd. for $C_9H_7ClN_4S$ (percent): C, 46.06; H, 3.01; N, 23.87. Found (percent): C, 46.17; H, 3.26; N, 24.02.

EXAMPLE 4

5(and 6)-chloro-1-(5,6-dihydro-4H-1,3-thiazin-2-yl)benzotriazole

To a solution of 4.9 g. 5-chlorobenzotriazole in 100 ml. of dry glyme, there is added 1.2 g. of sodium hydride (50% mineral oil dispersion) and the mixture is stirred at room temperature for one hour. Then, 5.0 g. of 3-bromopropylisothiocyanate dissolved in 10 ml. of glyme is added and the mixture is refluxed for two hours. The solvent is evaporated and water is added to the residue. The resulting solid is filtered off and crystallized from ethyl ether to give 3.8 g., M.P. 110–117°.

Calcd. for $C_{10}H_9ClN_4S$ (percent): C, 47.53; H, 3.59; N, 22.17; S, 12.69. Found (percent): C, 47.80; H, 3.83; N, 22.47; S, 12.73.

EXAMPLES 5 TO 24

Following the procedure of Examples 1 to 4 but substituting the benzotriazole derivative shown in column 1 of Table I below and the aliphatic haloalkylisothiocyanate shown in column 2, the product shown in column 3 is obtained.

Where the benzotriazole starting material is monosubstituted and includes a substituent at the 5 or 6 position, then the product shown in column 3 will include the 5-tautomer and 6-tautomer respectively; where the benzotriazole starting material is monosubstituted and includes a substituent at the 4 or 7 position, then the product shown in column 3 will include the 7-tautomer and 4-tautomer, respectively.

TABLE I

| Ex. No. | R (position) | n | Haloalkylisothiocyanate | $(R)_n$ (position) | $R^1$ |
|---|---|---|---|---|---|
| 5 | H | — | $SCN-CH_2-CH_2-Br$ | As in Column 1 | (thiazoline) |
| 6 | $C_2H_5$ (6) | 1 | $SCN-CH_2-CH_2-Br$ | ...do... | Same as above |
| 7 | $CH_3S$ (5) | 1 | $SCN-CH_2-CH_2-Br$ | ...do... | Do. |
| 8 | $CH_3$ (5) | 1 | $SCN-CH_2-CH_2-Br$ | ...do... | Do. |
| 9 | (thiazolyl)–NH–C(O)–NH– (5) | | 1 $SCN-CH_2-CH_2-Br$ | ...do... | (thiazoline) |
| 10 | $C_6H_5-C(O)-NH-$ (6) | | 1 $SCN-CH_2-CH_2-Br$ | ...do... | Same as above |
| 11 | $C_6H_5O$ (6) | 1 | $SCN-CH_2-CH_2-Br$ | ...do... | Do. |
| 12 | $CH_3C(O)$ (5) | 1 | $SCN-CH_2-CH_2-Br$ | ...do... | Do. |
| 13 | $C_6H_5C(O)$ (6) | 1 | $SCN-CH_2-CH_2-Br$ | ...do... | Do. |
| 14 | $C_6H_5CH_2$ (5) | 1 | $SCN-CH_2-CH_2-Br$ | ...do... | (thiazine) |
| 15 | $(C_2H_5)_2N$ (5) | 1 | $SCN-CH_2CH_2CH_2-Cl$ | ...do... | Do. |
| 16 | $C_4H_9O$ (5) | 1 | $SCN-CH_2CH_2CH_2-Cl$ | ...do... | Do. |
| 17 | Br (5) | 1 | $SCN-CH_2CH_2CH_2-Cl$ | ...do... | Do. |
| 18 | $C_6H_5OC(O)NH-$ (6) | | $SCN-CH_2CH_2CH_2-Cl$ | ...do... | Do. |
| 19 | $(C_2H_5)NH$ (6) | 1 | $SCN-CH_2CH_2CH_2-Br$ | ...do... | Do. |
| 20 | $CH_3NHC(S)NH-$ (5) | | $SCN-CH_2CH_2CH_2-Br$ | ...do... | Do. |
| 21 | $NO_2$ (6) | 1 | $SCN-CH_2CH_2CH_2-Br$ | ...do... | Do. |
| 22 | H | | $SCN-CH_2CHCl$ \| $C_6H_5$ | ...do... | $C_6H_5$-(thiazoline) |
| 23 | $CH_3$ (4) | 1 | $SCN-CHCH_2Cl$ \| $CH_3$ | ...do... | $CH_3$-(thiazoline) |
| 24 | H | | $SCN-CHCH_2-Br$ \| $C_2H_5$ | ...do... | $C_2H_5$-(thiazoline) |

What is claimed is:

1. A compound of the structure

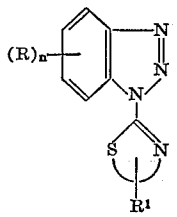

wherein R is selected from the group consisting of hydrogen; lower alkyl; lower alkoxy; aryl; aryloxy; lower alkanoyl; lower alkenoyl; monocarbocylic aroyl; monocarbocyclic aryl-lower alkanoyl; cycloalkanoyl; cycloalkenoyl; cycloalkyl-lower alkanoyl; cycloalkenyl-lower alkanoyl; lower alkylthio; nitro; halo; amino; mono- or di-lower alkylamino; mono- or diarylalkylamino; mono- or di-lower alkylarylamino; mono- or di-arylamino;

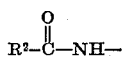

wherein $R^2$ is selected from the group consisting of lower alkyl, arylalkyl, alkylaryl, and aryl; —NHCOOR$^3$ wherein $R^3$ is selected from the group consisting of alkyl and aryl; and

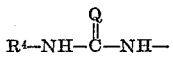

wherein Q is selected from the group consisting of oxygen and sulfur, and $R^4$ is selected from the group consisting of lower alkyl, aryl and cycloalkyl; $R^1$ is selected from the group consisting of hydrogen, lower alkyl and aryl;

represents a 5 or 6 membered ring; $n$ is 1 or 2; wherein the term aryl, unless otherwise limited, refers to a mono- or bicarbocyclic aryl; wherein alkyl is an alkyl of 1 to 7 carbon atoms; and physiologically acceptable acid-addition salts thereof.

2. A compound in accordance with claim 1 having the structure

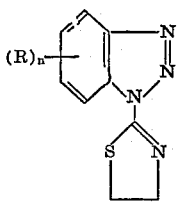

3. A compound in accordance with claim 1 having the structure

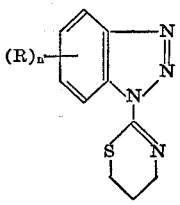

4. A compound in accordance with claim 1 having the structure.

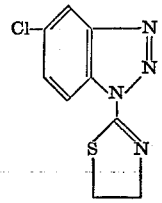

5. A compound in accordance with claim 1 having the structure

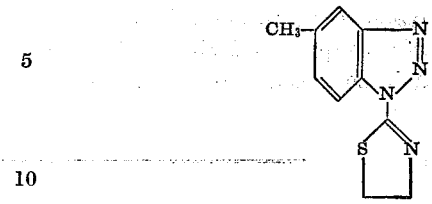

6. A compound in accordance with claim 1 having the structure

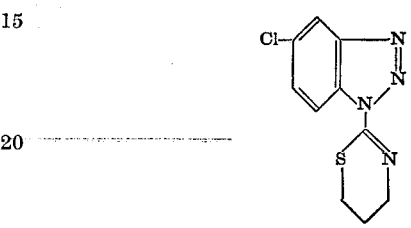

7. A compound in accordance with claim 1 having the structure

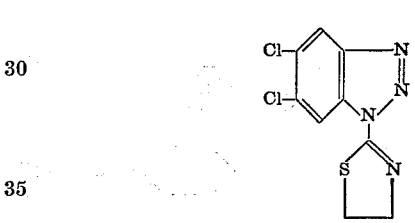

8. A compound of the structure selected from the group consisting of

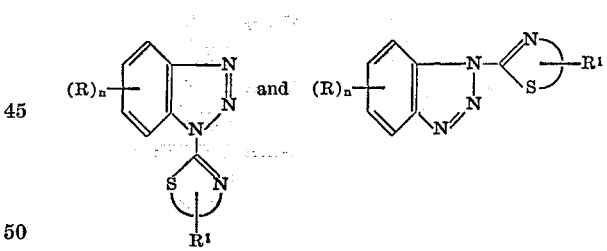

wherein R is selected from the group consisting of hydrogen; lower alkyl; lower alkoxy; aryl; aryloxy; lower alkanoyl; lower alkenoyl; monocarbocyclic aroyl; monocarbocyclic aryl-lower alkanoyl; cycloalkanoyl; cycloalkenoyl; cycloalkyl-lower alkanoyl; cycloalkenyl-lower alkanoyl; lower alkylthio; nitro; halo; amino; mono- or di-lower alkylamino; mono- or di-arylalkylamino; mono- or di-lower alkylarylamino; mono- or di-arylamino;

wherein $R^2$ is selected from the group consisting of lower alkyl, arylalkyl, alkylaryl, and aryl; —NHCOOR$^3$ wherein $R^3$ is selected from the group consisting of alkyl and aryl; and $$R^4\text{—NH—}\overset{Q}{\overset{\|}{C}}\text{—NH—}$$

wherein Q is selected from the group consisting of oxygen and sulfur, and $R^4$ is selected from the group consisting of lower alkyl, aryl and cycloalkyl; $R^1$ is selected from the group consisting of hydrogen, lower alkyl and aryl;

represents a 5 or 6 membered ring; $n$ is 1 or 2; wherein the term aryl, unless otherwise limited, refers to a mono- or bicarbocyclic aryl; wherein alkyl is an alkyl of 1 to 7 carbon atoms; and physiologically-acceptable acid-addition salts thereof.

References Cited
UNITED STATES PATENTS

| | | | |
|---|---|---|---|
| 2,577,409 | 12/1951 | Emerson et al. | 260—243 |
| 3,264,294 | 8/1966 | McHugh et al. | 260—250 |
| 3,398,157 | 8/1968 | Chemerda et al. | 260—302 |
| 3,499,083 | 3/1970 | Levitt | 260—243 X |

JOHN M. FORD, Primary Examiner

U.S. Cl. X.R.

260—306.7; 424—246, 270